US009405174B2

(12) United States Patent
Yakel et al.

(10) Patent No.: US 9,405,174 B2
(45) Date of Patent: Aug. 2, 2016

(54) PORTABLE IMAGE STORAGE DEVICE WITH INTEGRATED PROJECTOR

(76) Inventors: Norman Yakel, Regina (CA); Carol Casswell, Regina (CA)

(*) Notice: Subject to any disclaimer, the term of this patent is extended or adjusted under 35 U.S.C. 154(b) by 351 days.

(21) Appl. No.: 13/131,702

(22) PCT Filed: Nov. 30, 2009

(86) PCT No.: PCT/CA2009/001741
§ 371 (c)(1),
(2), (4) Date: Aug. 5, 2011

(87) PCT Pub. No.: WO2010/060220
PCT Pub. Date: Jun. 3, 2010

(65) Prior Publication Data
US 2011/0285875 A1    Nov. 24, 2011

(30) Foreign Application Priority Data

Nov. 28, 2008  (CA) ...................................... 2645745

(51) Int. Cl.
*G03B 21/12*    (2006.01)
*H04N 1/00*     (2006.01)
*H04N 9/31*     (2006.01)
*H04N 101/00*   (2006.01)

(52) U.S. Cl.
CPC ............ *G03B 21/12* (2013.01); *H04N 1/00127* (2013.01); *H04N 1/00167* (2013.01); *H04N 9/3141* (2013.01); *H04N 9/3173* (2013.01); *H04N 1/00132* (2013.01); *H04N 1/00283* (2013.01); *H04N 2101/00* (2013.01); *H04N 2201/0039* (2013.01); *H04N 2201/0084* (2013.01)

(58) Field of Classification Search
CPC .................................................. H04N 5/23238
USPC ......................................................... 348/333.1
See application file for complete search history.

(56) References Cited

U.S. PATENT DOCUMENTS 6,611,629 B2 *  8/2003  Bender et al. ................. 382/278
6,680,749 B1 *  1/2004  Anderson et al. ........ 348/231.99
(Continued)

FOREIGN PATENT DOCUMENTS

WO    WO 2007/024621 A1    3/2007
WO    WO 2008/117101 A1    10/2008

OTHER PUBLICATIONS

International Search Report prepared by the Canadian International Searching Authority on Mar. 10, 2010, for International Application No. PCT/CA2009/001741.

*Primary Examiner* — Anthony J Daniels
(74) *Attorney, Agent, or Firm* — Michael A. Bondi; Moss & Barnett

(57) ABSTRACT

A portable device for the storage and display of digital images, using an integrated projector for image display. The device itself might be a camera, smart phone or other portable or handheld electronic device capable of capture or storage of digital images. The integrated projector would allow projection of images at a larger size on an external surface than an internal display would permit. Certain embodiments of the device might also include image capture hardware, in addition to image storage, along with image editing or manipulation software. Method of display of digital images using a portable device with integrated projector is also disclosed.

25 Claims, 10 Drawing Sheets

(56) References Cited

U.S. PATENT DOCUMENTS

| | | | |
|---|---|---|---|
| 7,862,185 B2* | 1/2011 | Noba | 353/119 |
| 2002/0176015 A1* | 11/2002 | Lichtfuss | 348/333.1 |
| 2002/0186181 A1 | 12/2002 | Zodnik | |
| 2004/0141162 A1* | 7/2004 | Olbrich | 353/119 |
| 2005/0024604 A1 | 2/2005 | Ho et al. | |
| 2006/0291851 A1* | 12/2006 | Nozaki et al. | 396/429 |
| 2008/0001916 A1* | 1/2008 | Nozaki et al. | 345/156 |
| 2009/0021576 A1* | 1/2009 | Linder et al. | 348/36 |

* cited by examiner

PORTABLE IMAGE STORAGE DEVICE WITH INTEGRATED PROJECTOR

This invention is in the field of digital cameras and other similar portable image handling devices, and more specifically portable image handling devices which include an integrated projector which will allow for the projection of images stored within the device onto an external surface.

BACKGROUND

The widespread use of digital photography can be credited with an enhanced role for digital imagery as a communications or educational media. While visual media have always been a strong communications channel for educational or other purposes, the increased comfort level amongst key audiences from consumers through to educators with digital photography, digital video and digital image manipulation provides a strengthened role for the use of digital imagery as an educational tool. The use of digital imagery as a demonstrative aid however would be further enhanced by the use or availability of an integrated device which would allow for rapid and user-friendly capture, manipulation and display of images from various sources.

The widespread availability of digital cameras in many different types of electronic devices has further fed the increasing popularity of digital photography. Many different types of hardware devices currently include digital cameras for the capture of still or video images, including cameras themselves as well as portable music players, cell phones and other portable entertainment devices. Widespread availability of digital cameras makes it easy to capture digital photographs or other images for subsequent storage or review.

Even simply as a personal or social tool for the viewing of images, image capture or storage devices have become widely available and easily used. One of the limitations to the use of an image capture or storage device such as a digital camera, smart phone or the like at present is the limited ability to display images on the device in a large digestible format, since those devices typically include only a very small digital display. Particularly where the use of digital imagery was to be incorporated into a larger audience environment such as educational or the like, it is likely the case that the best type of image display or output hardware which could be used would be a projector of some type since this would allow for the provision of a large-format display which many people could view. There are certain digital cameras available which do presently provide for an interface to a television or the like so that the camera could be connected to an external display unit for the viewing of captured digital photographs without the need for uploading those photographs to a computer. However, insofar as even those types of units require the connection of the camera to an external device for the purpose of displaying captured digital images is believed that an integrated display device with a digital camera would be a desirable hardware enhancement.

Overall then having identified some of the platform technologies involved in the use or development of digital imagery in the context of communications or education, it is believed that a digital camera or other image storage device with an integrated image projector represents a novel enhancement over the state of image capture and display hardware available on the market today. Incorporation into that device of storage medium and computer processing hardware which would allow for the display of captured images on the projector as well as for the operation of resident image manipulation software would make the device further desirable. The user interface for image manipulation software resident in such a device could comprise the display and operation of the software and images via the integrated projector, along with whatever human interface device was desired. For example, in terms of the human interface and integrated keyboard, pointing device or the like could also be included, or the ability to connect the integrated device to external human interface devices such as a computer keyboard or mouse could also be provided.

SUMMARY OF THE INVENTION

The invention is a method and device for the storage and projection of digital images using a portable image storage device. A portable image storage device with an integrated image projector is not known in the art to date and represents a benefit or advantage over the state-of-the-art.

The device of the present invention is a portable image storage device with an integrated projector. It includes a memory for the storage of digital image data as well as an integrated projector for the external projection display of digital images. Also included is a processor which is configured to run an image display application for the retrieval of data stored in the memory, and to display those retrieved images via the integrated external projector. Finally there is included a projector activator which is contemplated to be a human interface device of some kind which allows the user to select the digital image or images stored within the memory of the device for display. The availability of compact projector technology which is of sufficient small size to allow for its incorporation into handheld or portable devices makes the overall concept of the present invention practical at this time.

The projector activator upon selection of an image by the user could activate the image display application within the device, causing the retrieval of the necessary data for protection of the image from the memory and activating the projector and the projection of same. The image display software component which would be responsible for the retrieval and display of the selected digital imager images from the memory could either be component within the operating system associated with the device on the processor or could be a separate software component stored in the memory thereof.

Numerous different types of human interface devices are contemplated in terms of the projector activator component. The human interface device could be selected from the group including a button,switch, a key, a dial, a touchpad, touchscreen, a key combination, a software device.

Many different categories of devices are contemplated to be within the scope hereof. For example, a digital camera might be fitted with a projector and then comprise a device in accordance with the present invention, as could be a mobile phone or other personal electronic device even including a media player or the like which had the ability to store images with this memory for subsequent display. The images which could be stored and retrieved for display could be still images or video.

In a more elaborate embodiment of the device of the present invention, there could also be an image manipulation software component contained within the device which would allow for the user to manipulate or edit images stored therein before their display.

In addition to a portable image storage device with an integrated projector, there is also disclosed a method of displaying digital images using a portable image storage device with integrated projector, the portable image storage device including a memory for the storage of data corresponding to digital images, a processor being configured to run an image display application for the retrieval of data stored in the memory, an integrated projector for the external projection and display of digital images, and a projector activator allowing a user to select a digital image stored within the memory for display. The method comprises first orienting the device such that there is a desired image projection surface in front of the integrated projector; detecting the selection of a digital image, being a selected digital image, from the memory for display by a user via the projector activator; using the image display application, retrieving the data required for display of the selected digital image from the memory, activating the projector and projecting the selected digital image, resulting in the projection of the selected digital image on the desired image projection surface. Various devices in accordance with the present invention can be used to practice this method.

Orientation of the device in relation to a projection surface could take place either before the selection of an image for display or after—it will be understood that the type of modification to the method of display of an image in this way is within the scope hereof. Activation of the projector to display an image would then simply just require the pointing of the projector and the device towards the surface for projection.

Imaging software capable of retrieval and display, or in more complex embodiments manipulation, of images of within the memory is also contemplated to be resident within the device. Optionally there might be a communications interface which would allow for wireless or wired connection of the device to a computer network such as the Internet for access to external assets for inclusion in the editing and manipulation of images. The image manipulation software could have varying types of functionality.

DESCRIPTION OF THE DRAWINGS

Preferred embodiments are provided in the accompanying detailed description which may be best understood in conjunction with the accompanying diagrams where like parts in each of the several diagrams are labeled with like numbers, and where.

DETAILED DESCRIPTION OF ILLUSTRATED EMBODIMENTS

Figure 1:
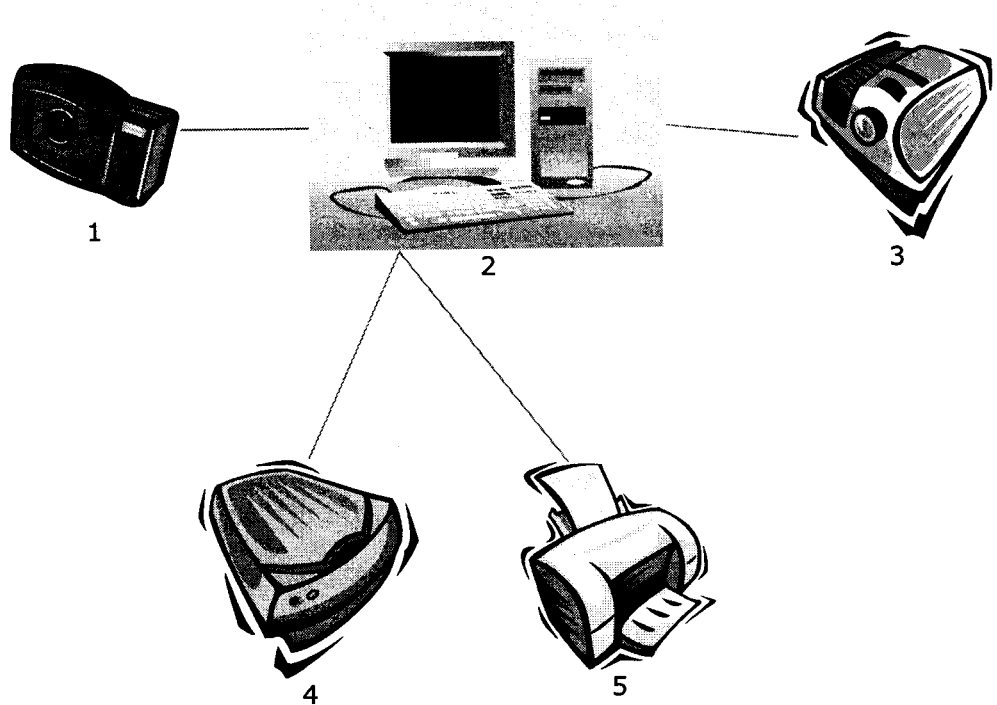
FIG. 1 is a general diagram intended to demonstrate a prior art hardware combination which the present invention is intended to overcome.

The following narrative is intended to generally describe the operation of selected embodiments of the present invention, for the purpose of outlining or enabling its operation to those skilled in the art. Review of this information will, to those skilled in the art, also infer or disclose reasonable modifications or extensions of the described subject matter, all of which are also contemplated within the scope of the present invention. In the description, similar parts are marked throughout the specification and drawings with the same respect to reference numerals. The drawings are not necessarily to scale and in some instances or portions may have been exaggerated in order to more clearly depict certain features or elements of the invention.

Prior Art:

As will be outlined in further detail below, the overall concept of the present invention is the provision of an integrated hardware device which allows for image capture, manipulation and large-format display, all in one single portable device.

Insofar as there is prior art which can be briefly demonstrated for the purpose of further supporting the novelty of the present invention, the present combination of items which would most reasonably or foreseeably be used by an individual wishing to accomplish this same set of objectives would be a digital camera, personal computer containing a full image manipulation software suite, as well as a data projector connected to the computer. Pictures could be captured using the digital camera and uploaded to the computer where they would be formatted or manipulated using the software resident on the computer. Finally, the computer and projector would be used in conjunction to display the results of the image capture or manipulation.

FIG. 1 demonstrates this prior art combination in further detail. Again the precise nature of the hardware combination demonstrated in FIG. 1 is intended primarily for demonstration purposes and it will be understood that there are many other different types of hardware combinations which the integrated image handling device of the present invention would also overcome. There is shown first of all in this Figure a digital camera 1, which is connected at some point to a personal computer 2 for the purpose of uploading data or images from the camera to the PC. The PC 2 would include potentially some type of image manipulation software for the purpose of either simply loading and re-displaying images from the camera 1 or alternatively for the purpose of editing those images. The next element demonstrated in this Figure is a projector 3 which is connected to the personal computer 2 so that images from the personal computer 2 can be displayed in a large format. It may also be the case that in certain prior art embodiments no projector 3 was used in that the desire was simply to display images from the camera 1 on the screen of the PC 2. Removal of the projector 3 from the prior art hardware combination demonstrated in this Figure will be understood by those skilled in the art but the rendering or creation of the integrated image handling device of the present invention will still be understood to be novel over the general prior art combination demonstrated in this Figure on the basis that the integrated nature of the camera and the output device which in the case of the present invention is a projector, as outlined in further detail below, when coupled with some type of image editing or manipulation software resident on storage medium and executed upon hardware contents of the integrated device are contemplated within the scope of the present invention.

Also shown in FIG. 1 are a scanner and a printer 4, 5 respectively operatively connected to the personal computer 2. Those two peripherals are demonstrated in this Figure simply for the sake of discussion elsewhere below—the scanner 4 would be used if the user wished to scan some other type of a hardcopy document into an image asset for use in any combination or image manipulation step using software on the computer 2, and the printer 5 is obviously shown just to demonstrate that in certain circumstances it may be desirable once an image is manipulated using the personal computer 2 to generate a hard copy using a printer.

The complexity and relative cost of this hardware combination can be seen and understood from this general description. Three different pieces of hardware, namely the digital camera as well as a computer and projector, would be required. Beyond the cost of this hardware configuration it will also be understood that generally speaking this is somewhat unwieldy in the case of a user who wishes to in a quick and straightforward manner conduct some basic image capture and display with intermediate image processing, since in addition to the need to actually have all three of these pieces of hardware there are other intermediate steps involved such as the connection of the projector on the computer when the display step comes up, the physical loading of the photos from the camera across to the computer taking additional time, as well as the fact that depending upon the nature of the image manipulation software employed on the personal computer there may be significant functional knowledge required to accomplish the desired effects.

Based on this general outline of one prior art configuration of computer hardware and software which could be used in a digital photography capture, manipulation and display, it is suggested that the novelty and utility of the present invention, namely an integrated image capture, manipulation and display device can be demonstrated in further detail.

Image Storage Device:

As outlined elsewhere herein, the primary concept of the present invention is to provide an image storage device which is portable and which includes an integrated projector so that they can be displayed in a large format.

Insofar as the invention relates to a portable image storage device, any electronic device which is capable of storing the necessary data to render digital images, either still or motion video, is contemplated within the scope of the present invention. Specifically what is contemplated as the two primary types of devices into which the integrated image projector of the present invention could be added are either mobile telephones or digital cameras. Many mobile telephones now include digital cameras, or a standalone digital camera also has the necessary hardware and software to store and recall for display images from its memory. While any other number of different types of image storage devices, which could be any electronic hardware capable of the storage of image data such as MP3 players, personal digital assistants, or even a portable laptop computer, could also comprise the portable image storage device of the present invention it is the mobile telephone and digital camera embodiments which are demonstrated herein for the purpose of illustrating the present invention.

Figure 2:
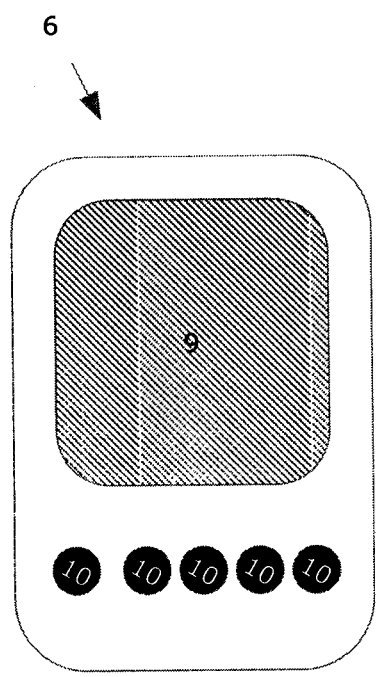
FIG. 2 is a diagramatic front view of one embodiment of the integrated imaging device of the present invention, wherein the overall device format is that of a mobile phone.
Figure 3:
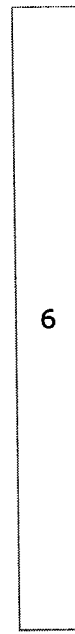
FIG. 3 is a diagramatic side profile of the embodiment of FIG. 2.

In terms of the specific hardware aspects of the device of the present invention, FIG. 2 demonstrates one embodiment of a portable image storage device 6 in accordance with the present invention. The device 6 itself is a mobile telephone/PDA, such as a Blackberry™ organizer or the like. FIG. 2 is a front view of the device. FIG. 3 is a side profile and FIG. 4 shows the rear surface of the device 6.

The device 6 effectively comprises a digital camera 7 along with an image projector 8 which is built into the device 6. For the sake of simplicity in this diagram, the device 6 which is shown as a modified telephone or PDA organizer into which a small footprint video projector 8 has been incorporated. As discussed elsewhere herein in further detail, there are projectors of sufficiently small size available or coming available in the market which make the inclusion of an image projector such as this into a handheld or portable device a possibility.

While the device 6 shown in this Figure is a modified PDA which incorporates a projector 8 along with a digital camera 7 it will also be understood that the form factor of the device 6 could take other various forms. For example, it may be necessary to produce a device 6 which was somewhat larger than the small regular format PDA or handheld digital camera in order to accommodate all of the necessary internal components to provide for the processing ability to host image manipulation software or otherwise accommodate necessary requirements to execute the entirety of the present invention, but so long as the device in the aggregate fits within the general categorization of "portable" so that it can be transported easily and used, it will accomplish the goals of the present invention.

Figure 4:
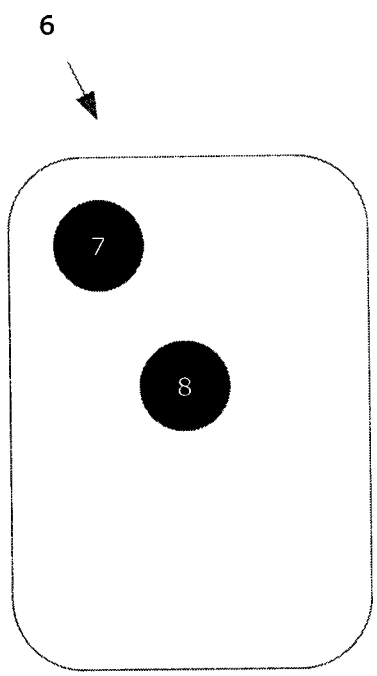
FIG. 4 is the diagramatic rear view of the embodiment of FIG. 2.

In the case of the device 6 of FIGS. 2 through 4, there is in addition to the projector 8 shown a digital camera 7 as another component of the device 6 as outlined above, many PDA or telephone devices now include digital camera hardware which allow for the capture of images or video to internal memory on the device 6 and so this is shown in this fashion to outline the applicability of the inclusion of an integrated projector 8 at the core of the present invention in such a device. It will also be understood however that the general concept of the addition of an integral projector 8 into a portable image storage device 6 does not require the inclusion of digital camera hardware 7 to be within the scope of the present invention. It is specifically contemplated that in certain cases image capture may not be on board within the device and in fact that the device 6 may just store image data which is loaded into it by the user from another computer or other digital information source. The portable image storage device of the present invention could be a device which did or did not include camera components and both such approaches are contemplated within the scope of the present invention.

Also shown in the device 6 of FIG. 2 are a display screen 9 and a series of buttons 10 which would be involved in the general operation of the device 6 as a human interface but may also specifically be involved in the handling of image display transactions in accordance with the present invention insofar as the human interface could be used to select images stored within the memory of the device 6 for display via the integrated projector 8. There are various types of human interface display mine or data entry 10 components which could be used in portable image storage devices in accordance with the present invention and these will be obvious to one skilled in the art of such device design and all such modifications or variations are contemplated within the scope of the present invention.

Figure 7:
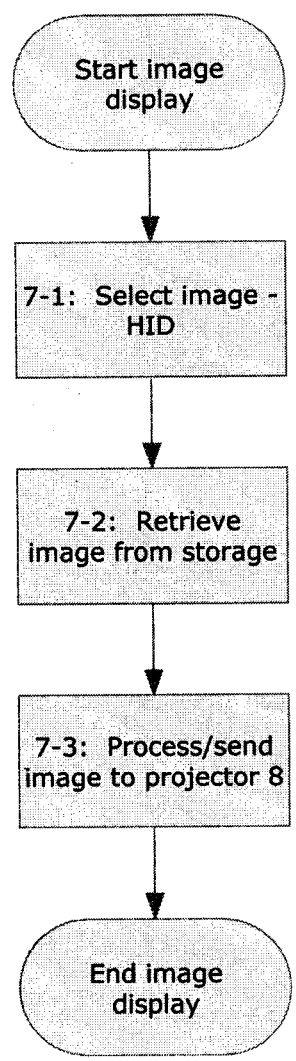
FIG. 7 is a flowchart demonstrating one embodiment of an image display transaction using the device of the present invention.
Figure 8:
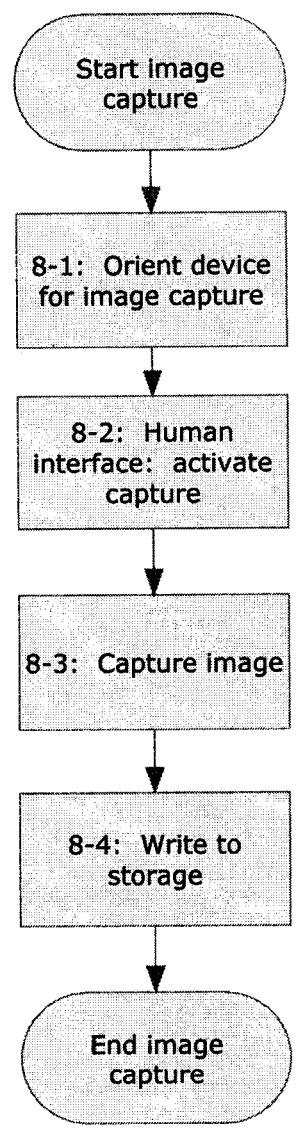
FIG. 8 is a flowchart demonstrating one embodiment of an image capture transaction using the device of the present invention.

As indicated above, alternate embodiments of the device 6 of the present invention, beyond the mobile telephone device shown in FIG. 2 through FIG. 4, might include a digital camera with an integrated projector 8. In that case the digital camera itself would comprise the enclosure of the device 6, as well as including the actual specific camera components 7 which would be potentially required for image capture. Referring to FIG. 7 there is shown a perspective diagram of one embodiment of a device 6 in accordance with the present invention which is a digital camera 6 including an integrated projector 8.

Figure 5:
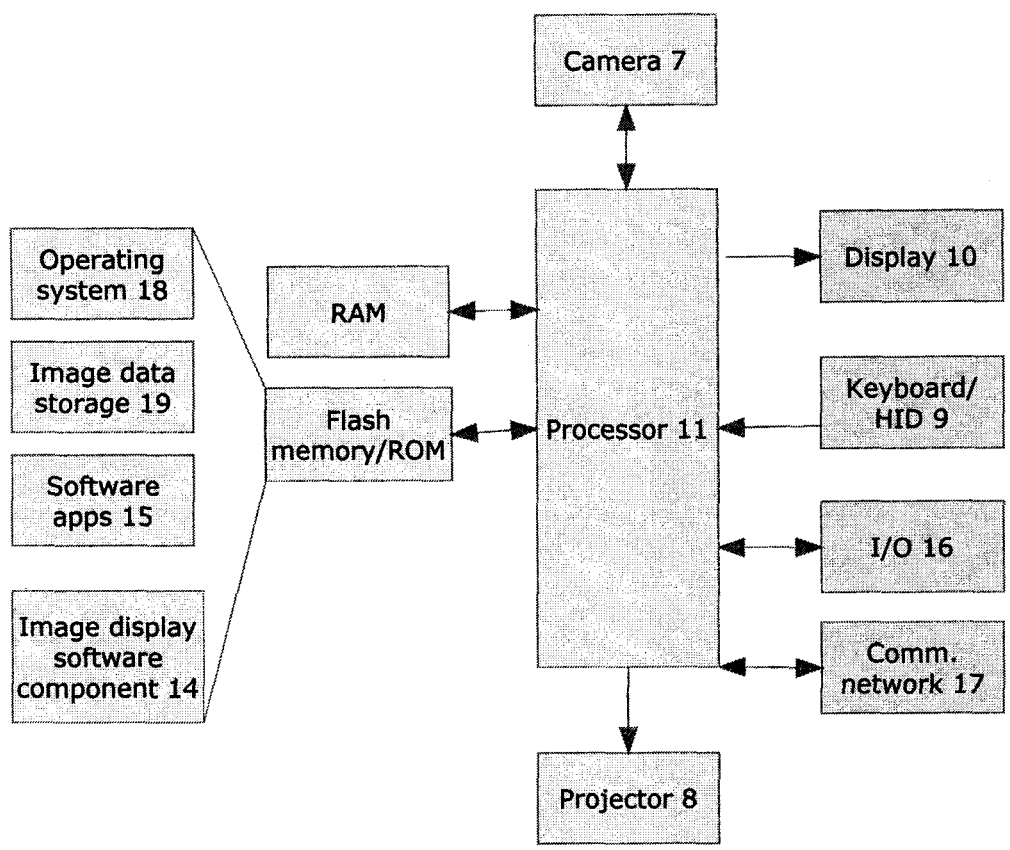
FIG. 5 is a block diagram of one embodiment of the electronic components of the embodiment of FIG. 2.

Referring to FIG. 5 there is shown a block diagram of the various components of the embodiment of the portable image storage device of the present invention shown in FIG. 2. much of the hardware and its components will be understood to one skilled in the art of electronics design, in terms of onboard processors etc. as well as cameras, computers and the like. The device 6 would include a processor 11 which would perform the various data capture and processing functions of the device 6. The device 6 might also optionally include image processing and manipulation software of some kind and on that basis the processor 11 would need to be capable of performing those functions as well.

The processor 11 controls the overall operation of the device and interacts with various subsystems of the device 6 such as the display 10, flash memory 13, RAM 12, I/O systems and the like. The device 6 in this case includes an integral camera 7 that interacts with the processor 11. The device 6 would also include some type of human interface 9 whereby it could be controlled or interacted with by a user—in this particular case for demonstrative purposes, and referring back to FIGS. 2 through 4, the human interface which is shown as a plurality of buttons or control switches 10.

Operating system software 18 and various software applications 15 used by the processor 11 are stored in persistent memory store such as flash memory 13 or the like. Parts of the software instructions however could be temporarily loaded or stored into a volatile stores such as random access memory 12.

The operating system 18 and other software applications 15 would control various applications or functions of the device 6. Other software applications 15 could also be stored on the device 6 for noncommercial purposes.

The other key component of the information which would be stored within the persistent memory store 13 are digital image data corresponding to digital images which it may be desired to display from the device 6. The digital images which are stored, and this data, may be still or video.

One further specific software application which it is anticipated would be stored within the memory 13 for access and execution by processor 11 is an image display software component 14 which would effectively comprise any software application which could be executed by the processor 11 to select/retrieve one or more images from the data store of digital image data within the device for display via the projector 8. Once the user had selected through the user interface 9 the image or images which it was desired to display, the image display software component 14 would work in conjunction with the remainder of the operating system and operational software applications resident upon the device to retrieve the digital image data corresponding to those items to be displayed from the memory of the device and transmitting or handing that to the related software or hardware components of the projector 8 for projection of those images. In certain cases, it may be necessary for the software applications or components of the operating system and device 6 to include any necessary additional filters, plug-ins or codecs for the proper playback or display of those images.

The detailed operation of the device 6 will be understood by those skilled in the art of the design and programming of electronic devices such as this but to describe for a moment the overall process involved in the display of images in accordance with the present invention, the device 6 via the display 10 would provide to the user an interface by which, using the keyboard or other human interface 9, the user could select one or more images stored in the image data store 19 which they wish to project using the projector 8. The actual software components of the device 6 which would be involved in this process would be the image display software components 14.

Once the device 6 via the image display software components 14, the processor 11 and other related components assisted the user in selecting one or more images from the image storage 19 for display, the processor 11 and the driver components of the image display software 14 would retrieve the necessary image data from the store 19 and project via the projector 8 the images which were selected by the user. Upon activation of the projector 8, the projector 8 would actually project the selected digital images onto a surface onto which it was pointed. The method of image display deployed using the device 6 is also disclosed in further detail below.

Figure 6:
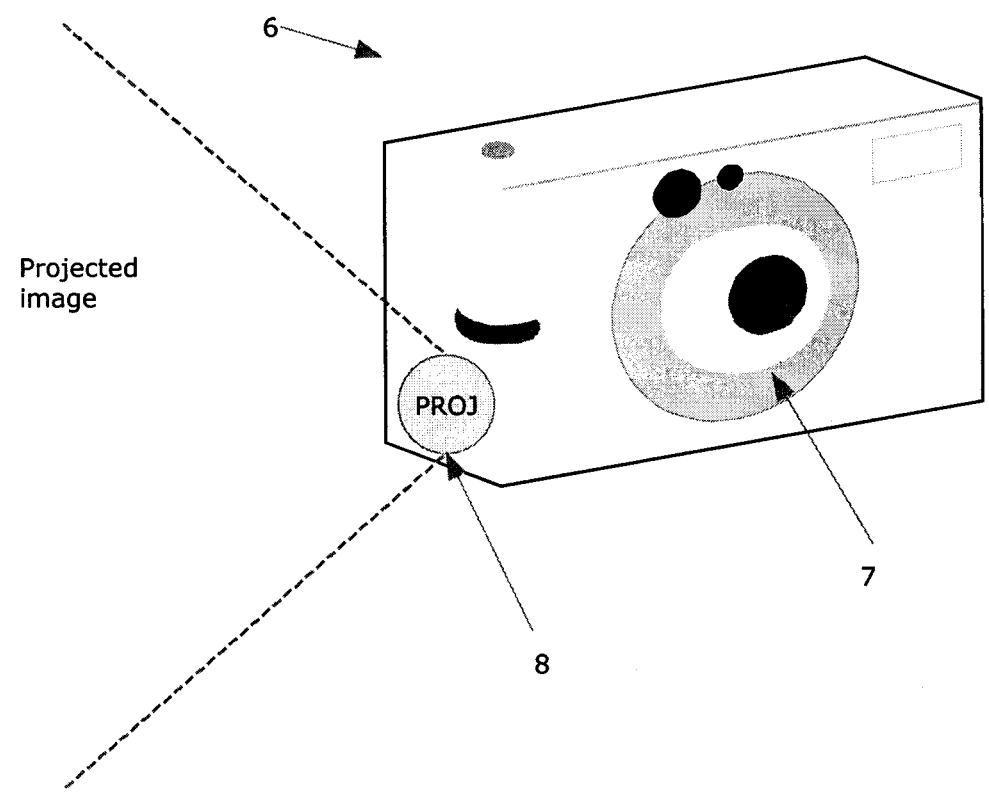
FIG. 6 is a perspective diagram of one embodiment of the integrated imaging device of the present invention, wherein the overall device format is that of a digital camera.

FIG. 6 demonstrates an alternate embodiment of the device 6 in which the overall format of the devices that a digital camera with a built-in projector 8 rather than a mobile telephone or personal electronic assistant as is shown in FIG. 2. In addition to these two contemplated types, it is also specifically contemplated that for example a media player such as an iPod™ or similar device could also be fitted with a projector 8 and the remaining software components outlined herein to allow for the practice of the method of the present invention using that device and the rendering of such a device is also contemplated within the scope of the present invention insofar as it would comprise a portable image storage device with integrated projector, which are the two key aspects of the device of the present invention.

It may also be the case that a purpose built device 6 could be manufactured in accordance with the present invention which would perhaps have optimized camera or projector components therein or be more purpose built for a particular market and the custom manufacturer of the device 6 in accordance with the remainder of the present invention is also contemplated within the scope hereof.

Image Display Software:

The image display software component 14 of the present invention would be a software components either integral with the operating system of the device 6 or otherwise stored within the memory of the device 6 which could in conjunction with the other hardware and software components of the device 6 facilitate the projection of images by the projector 8 upon selection of one or more images from the memory of the device 6 by the user. It will be understood that many different types of image display software components 14 could be developed which would accomplish the objective of retrieving selected image data from the memory of the device 6 and properly processing or handling that in conjunction with the remainder of the software or hardware components associated with the projector 8 so that the projector 8 would project the selected image for display. Any image display software component 14 which accomplishes this objective in the context of a similar device with image storage capacity and an integrated projector is contemplated within the scope of the present invention.

Enclosure:

The portable image storage device 6 would include its components within an enclosure such as those which are shown—for example if the overall form factor and format of the device was that of a mobile telephone then the integrated projector 8 and remaining components of the present invention would be encased within the enclosure of the telephone 6. If a purpose built device 6 were being manufactured some type of an enclosure would also be provided to protect and properly orient the various components.

Memory:

The device 6 would include memory to store electronic data corresponding to digital images. There might also potentially need to be other memory or storage on the device 6 which was capable of storing processor instructions, software or other unrelated information for the remainder of the device or which are necessary for the execution or operation of other functions of the device 6. Various types of physical memory could be used dependent to a degree upon the remainder of the hardware used in the device 6 and all types of memory hardware which were capable of interfacing with the remainder of the electronic components selected for the device 6 are contemplated within the scope hereof.

The storage medium in the device 6 could either be solid-state storage such as a memory chip or the like, or if a larger degree or amount of storage was required then could be feasibly integrated into the device 6 using a solid-state technology, then it might also comprise a disk drive or some other such similar storage device which when integrated along with the processor 9 and other related software and hardware components could provide for larger capacity image storage and software storage on the device. In the case of solid-state large capacity storage, it will be understood that memory cards such as those currently used in digital cameras and the like are an ideal component for use in this capacity as well.

Camera:

In various embodiments of the portable image storage device 6 of the present invention, where a camera is included in the device 6, the camera 7 will be located in different locations on the back of the device 6 [as is shown in respect of the embodiment demonstrated in FIGS. 2 through 4]. In some embodiments the camera 7 will be located in different locations on the back of the device 6, and the device 6 could have different configurations other than those shown. In some embodiments, where a camera 7 was included it may even be configured to pivot or be movable.

It is not necessary for the purpose of illustrating the present invention to outline in further detail all of the different circuitry involved in a digital camera 7 as basically the integration of the digital camera 7 to the overall device 6 in a fashion that digital images could be captured by the camera 7 components for storage to the memory of the device 6 and subsequent display or manipulation are understood in the art.

Projector/Display:

The key electronic component of the present invention is the projector 8 and related necessary video interface with the processor 9 and remainder of the components of the device 6 to allow for large-format projection of images from the memory of the device 6 without the need for reliance on any external projection equipment or hardware.

In the near term the desirable format for the overall device 6 will be to use a small format LED-based projector within the device. There are now LED-based pico projectors which are becoming available on a standalone basis in the marketplace which allow for a projector of acceptable projection quality in a far smaller footprint and with a far smaller power consumption. In fact it is believed that this type of a pico projector could be incorporated into a currently standard sized mobile camera or phone case in accordance with the present invention. Any type of a projector which could be incorporated into an enclosure with a digital camera 7 and the other related components for image capture, manipulation and display are contemplated within the scope of the present invention.

In various embodiments of the portable image storage device 6 of the present invention, the projector 8 will be located in different locations on the device 6 [as is shown in respect of the embodiment demonstrated in FIGS. 2 through 4]. In some embodiments the camera 7 will be located in different locations on the back of the device 6, and the device 6 could have different configurations other than those shown. In some embodiments, the projector 8 may even be configured to pivot or be movable.

By projecting images onto an external projection surface rather than on an integral display within the device 6, a larger image display will be accomplished without unnecessarily increasing the size of the device 6 itself. Any number of different types of surfaces could be used for image projection—there could be a screen which was close by onto which an optimized image could be projected or even a wall or some other surface could be used.

In addition to the projector 8, it is also possible that the device 6 would include additional external interfaces such as a printer port or the like to which the device 6 could be connected so that different types of output from the device 6 could be accomplished such as printing of captured or manipulated images and the like. Also as is outlined elsewhere herein if the device 6 contained a communications or network interface, it would be possible for output from the device to take the form of network transmission to either a printer or other output device or even a storage device connected to that network. It is contemplated in any event that a logical addition to certain embodiments of the device 6 would be a printer port or other similar external communication ports or buses and those are contemplated within the scope hereof.

The human interface 17 of the device 6 as outlined elsewhere herein could take various forms, from a simple button or switch interface on the device in some fashion through to an on-screen keyboard or iconic interface of sorts in conjunction with the projector 8. As is described elsewhere herein, the human interface 10 would be whatever type of an input device or combination of devices or interfaces was determined to be appropriate for interaction of the operator of the device 6 with the various functions thereof. All such human input devices or variations are contemplated within the scope of the present invention. It is specifically contemplated that in certain more sophisticated image manipulation embodiments of the invention that the human input device would interact with menus or other options which would be displayed via the projector 8 for activation or operation by the operator.

Projector Activator:

In terms of the device, the next key element is the projector activator. What is intended by this terminology is to suggest the human interface by which a user of the device 6 could activate the projection of a particular image stored in the memory of the device 6 onto an external surface using the projector 8. The projector activator/human interface 9 is contemplated to be any combination of software or hardware components by which the user of the device 6 view and/or select one or more images from the memory of the device 6 for display by the projector 8.

The human interface 9 which is used in association with the device 6 could take many different forms, as will be understood to someone aware of the varying types of electronic interfaces which can be developed for use with devices of this nature. Basically any type of a electronic interface which allows on its own or in combination with other similar components on the device 6 which would allow for a user to interact with the device 6 and its residents software components for the purpose of selecting images for display is contemplated within the scope of the present invention. Specific items or ideas for the human interface device or interface include a button, a switch, a key, a dial, a touch pad, a touch screen, a key combination, a software device.

The human interface could be anything from a customized set of keys, switches or buttons which would allow a user to interact with the device 6, through to a connection for a keyboard or an integrated keyboard or mouse or the like, in a more traditional PC oriented implementation. The human interface might even comprise a touchscreen somewhere on the device through which different menus and the like could be displayed in the user could interact by pressing on-screen on different selections.

Method of Image Display:

In addition to the portable image storage device of the present invention, there is also disclosed a method of display of a digital image from a portable image storage device with an integrated projector and the other components outlined herein.

Referring to FIG. 7, there is demonstrated a three-step flow for the generation of an image display using the projector 8 which is integrated into the device 6.

Shown first at step 7-1 is the selection of an image file to be displayed. This would be done by the user using whatever type of human interface 9 was integrated into the device and it is specifically contemplated that for example the human interface 9 might be used to select from icons representing different images stored within the device 6 as will be shown on the menu are selection screen which is being projected by the projector 8. In any event this first step would be the selection of an image for display in a basic image display transaction. Alternatively at the tail end of an image manipulation transaction the image may be directly displayed without the need to be selected from such a menu.

Once an image was selected by the user of the device 6, the software resident in the device 6 would result in the retrieval of that image from the memory of the device for display. Retrieval of the image which was selected from the storage of the device by the software and the PROCESSOR 11 along with remaining or related components of the device 6 is shown at step 7-2.

Having identified and retrieved the selected image from memory or storage, the PROCESSOR 11 and remaining components of the device 6 would then process or send that image to the projector 8 for display. The human interface 9 might also allow for adjustments of the projector 8 to adjust the display of the image, as appropriate. Again similar to the image capture transaction demonstrated above, this type of an image display transaction is not particularly complex. The novelty however of this transaction, in conjunction with the configuration of the device 6 of the present invention and the image capture transaction demonstrated by FIG. 5, is the fact that there is an integrated large-format display device, namely a projector 8, contained within the device so that no external hardware is required for large-format display of images from the device.

Image Capture Transaction:

Image capture could be conducted if the device included a camera 7 which is capable of capturing digital images such as photographs and storing them to memory within the device 6. As outlined generally above, for the purpose of the present disclosure and invention, the specific componentry of a digital camera or a digital image capture circuit will be obvious to one skilled in the art and on that basis there will be a range of approaches which can be taken to providing that type of functionality without departing from the scope of the present invention. The basic componentry of a digital camera, being a digital image sensor and a lens operatively connected to the remainder of the processor 9 and the other circuitry of the device 6. Any combination of hardware or software which can accomplish the objectives of capturing digital images for storage or manipulation within the remainder of the device 6 is contemplated within the scope of this component.

External Asset Capture:

As discussed elsewhere above from a cursory level, an optional element of the device 6 of the present invention is a communications interface 17 by which the device 6 could either export or write images after capture or manipulation to an external network or storage location, or more likely could be used for the purpose of capturing external image assets for use in the manipulation and display of images by the remainder of the device 6. It is primarily contemplated that the communications interface 17 would be a wireless network interface such as those used in laptop computers, PDAs and the like, to access a wireless LAN cloud in a location. By virtue of this type of an interface 17, the device 6 could be used to, for example, download images from the Internet or elsewhere for use in manipulation and display on the device 6. In a circumstance where the communications interface 17 was a network interface being used to access the Internet, or a similar external location, it may also be necessary for either the image manipulation software or other software components resident upon the device 6 to include a browser, but the inclusion of a browser or a browser type component to the image manipulation software resident upon the device 6 will be something that can be accommodated or easily incorporated by one skilled in the art of software design and as such is all contemplated within the scope of the present invention as well.

Beyond a wireless LAN interface, it is also conceivable that the device could actually include a wireless WAN interface 17 instead. For example a GSM or CDMA wireless modem could be included in the device if it was desired to provide, obviously at a higher cost, a device 6 which could be used broadly and in locations where there might not otherwise be a local wireless network cloud available.

The communications interface 17 could also be a hardwired interface rather than a wireless interface. For example it could be a hardwired network connection by which the device, with the necessary attendant network stack in the software of the device 6 could access a TCP/IP network or a network using another communications protocol, again to access external storage or even the Internet for the purpose of download or upload of images and assets to and from the device 6. Finally the communications interface 17 beyond being a network interface might also be simply a port by which an external storage device could be connected to the remainder of the device 6. For example it could comprise a USB port 15 by which a memory stick or other external storage device or drive could be connected to the remainder of the device 6.

Any type of a communications interface 17 which will accomplish the objective of either allowing for the export of captured images from the device 6 or more importantly the import of external assets into the memory of the device 6 for use in association with captured images in manipulation and display thereof is contemplated within the scope of the present invention.

Image Manipulation Software:

In certain embodiments of the method and device of the present invention, an additional component which could be added to the device would be an image manipulation software component on the device 6. Even more basic embodiments of the device 6 which may not have a communications interface by which external image assets could be loaded or used in the manipulation of final images for display, the software within the device 6 would need to be capable of displaying images to the projector 8. This would be within the function of the projection interface, as outlined above, but the addition of a more fully featured image-editing software which would allow for manipulation of images stored within the memory on the device 6 would basically comprise a set of processor instructions stored on the device 6 which when loaded into the memory of the device 6 would allow the processor thereof to access images stored within the memory and to reformat or adjust them. The precise nature of the software which will be required to accomplish this objective could be created by one skilled in the art of programming for such devices and all such variations are embodiments which would accomplish the objective of allowing for the device 6 to manipulate images stored within the memory thereof and/or reformat or adjust them is contemplated within the scope of the present invention.

In a more elaborate embodiment the image manipulation software component which would be contained within the device 6 for image viewing and manipulation could allow for the actual manipulation and editing of the images "on the device" without the need for transfer of any captured images to a PC or the like. This more elaborate image editing and manipulation functionality may require a more elaborate human interface to the device 6—such as for example more featured display, keyboard or the like.

It is explicitly contemplated that providing a powerful image editing suite, which was user friendly, as the image manipulation and viewing software on the device 6 would be the optimal presentation of the overall invention and device 6. Providing a device 6 which allowed for image capture with the camera 7, image projection with the projector 8, as well as for full-featured and yet easy to use image manipulation using software resident upon the device as well as a related human interface, is at the highest level the preferred embodiment contemplated of the present invention. In this embodiment image manipulation software would allow for deep functionality in the editing of images contained within the device 6 and their rapid display. One explicitly contemplated end use for this device 6 in this format is in education or other industries such as sales and marketing where it would be desirable to be able to on a live basis effectively rapidly mockup edited images or presentation slides based on captured images as well as downloaded or externally acquired digital assets.

It will in any event be understood that the use of any kind of software on the device 6 which accomplishes the basic objective of allowing for the display of images captured by the camera 7 by the projector or other video device 8, and might also allow for varying degrees or levels of editing to take place on the device in conjunction with the human interface 17, is contemplated within the scope of the present invention.

Figure 9:
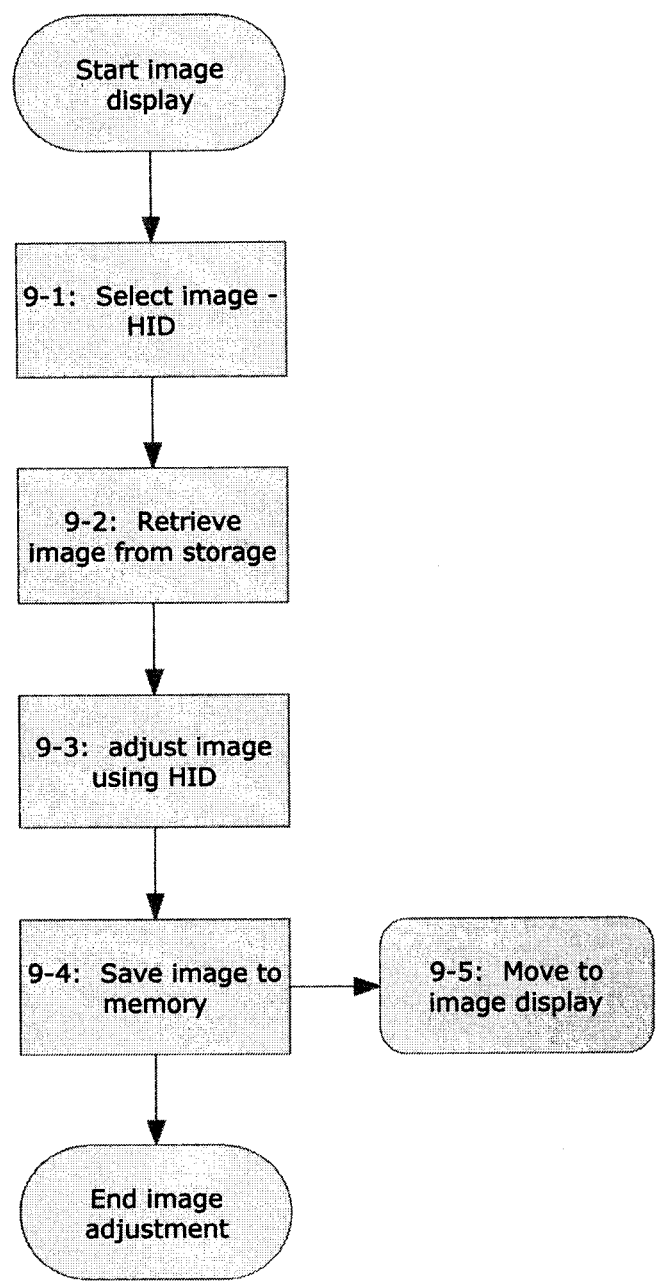
FIG. 9 is a flowchart demonstrating one embodiment of an image manipulation transaction using the device of the present invention.

The first type of an imaging manipulation software or transaction which is shown, in FIG. 9, is an imaging adjustment transaction where an image captured using the camera 7 of the device 6 is being adjusted perhaps by adjusting the lighting, cropping etc. before displayed by the projector 8. Referring to FIG. 9 there is a flow chart demonstrating one type of such transaction where it is contemplated that an image from the memory of the device 6 would be identified and certain adjustments would be applied to that image before its saving to the display. Similar to the display transaction demonstrated in FIG. 5, the first step in the transaction flow FIG. 9 is the selection of an image from the memory of the device by the user using the human interface device 17, shown at step 9-1. Once the user selected an image from the memory of the device 6 the image would be retrieved from the storage of the device, demonstrated at 9-2.

Once the selected image was loaded into the memory of the device 6, the next step would be for the user of the device 6, using the interface 17 and the software which was resident in the memory of the device 6 and had been also loaded appropriately into the memory of the device 6 such that the processor mine and other components could in conjunction there with edit the selected image, to use the interface 17 to apply the desired changes to the image. Various types of image formatting changes are contemplated and could be accomplished using image manipulation software within the device 6. For example color settings of the image could be adjusted, cropping could be done even through to more elaborate functions being available in the image manipulation software. It will be understood that any type of an image editing function that can be contemplated in the mind of a person skilled in the art of programming such software could be accomplished using the device and method described herein so long as the functionality could be accommodated in the software and processor instructions stored within the device 6 for use in image manipulation thereon.

Shown next at stage 9-4 is the saving of the edited image to the memory of the device 6. Once the edited image was saved back to the memory of the device it could either be the end of the flow chart as is shown in the one avenue at the end of the flow chart of FIG. 9, or also once the image was saved at 9-4 it could go on to be displayed using an image display flow such as that demonstrated in FIG. 5. Again in terms of the capabilities of the imaging manipulation software which are contemplated herein, the capabilities of that software could be anything from the most basic image selection and viewing software which would not allow for manipulation such as that shown in FIGS. 6 and 7, through to more elaborate software which could accomplish the application of editing or feature changes to images within the memory of the device 6 such as demonstrated in FIG. 9, or even the combination of multiple images or assets into finished images or works based upon the incorporation of an externally acquired assets or images along with those captured within the memory of the device using the camera 7 integral therein.

Figure 10:
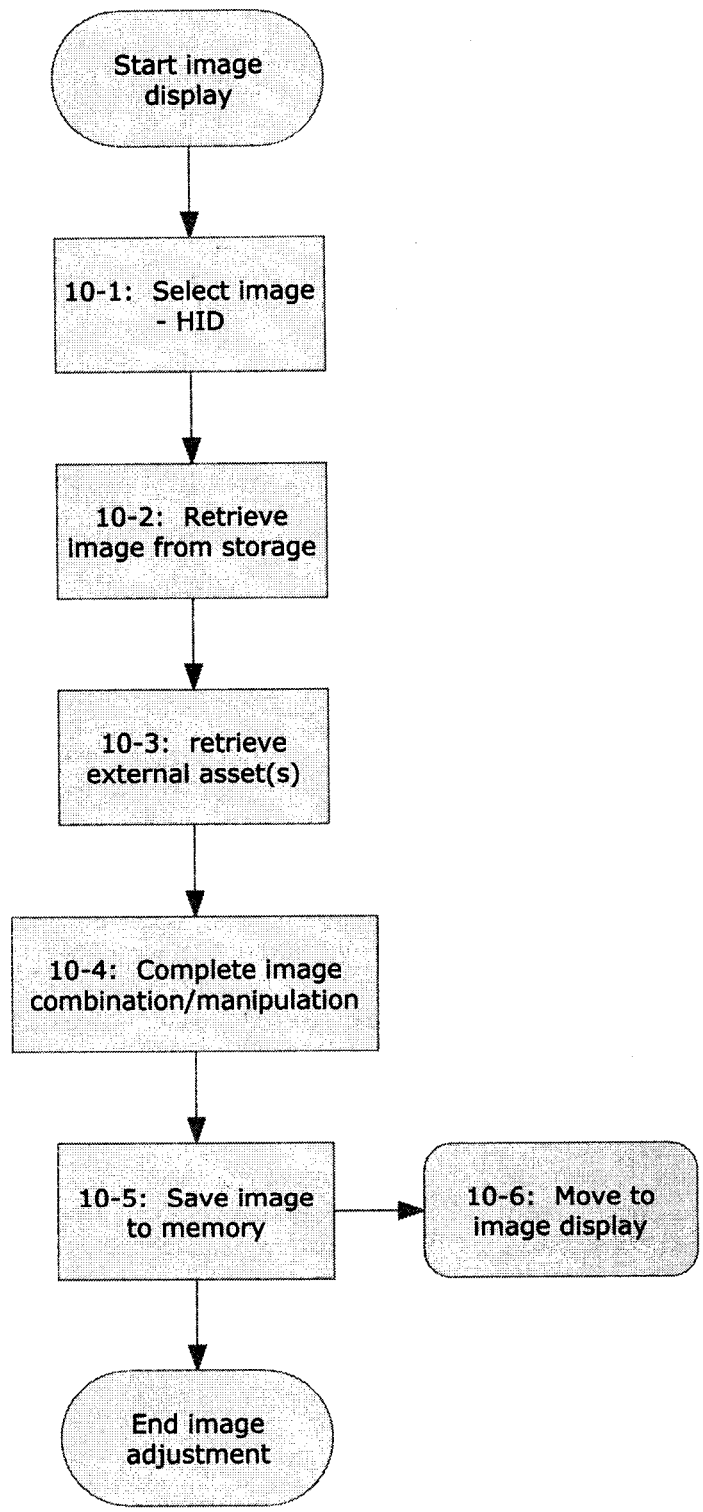
FIG. 10 is a flowchart demonstrating another image manipulation transaction using an embodiment of the device of the present invention.

The final basic data transaction which is shown in a flow chart at the present time for the sake of demonstration of more advanced contemplated functionality of the device 6 of the present invention is shown in FIG. 10 which is a flow chart of one embodiment of the image manipulation transaction. The particular embodiment of the device 6 which would be used in the execution of the image manipulation transaction demonstrated in FIG. 10 would be a device 6 which included a communications interface 17 with an external network such as the Internet, because it is contemplated that in this particular embodiment or transaction, externally accessed images or assets, such as images available from the Internet or network storage locations, would be incorporated along with images captured by the camera 7 in the device.

Similar to the display transaction demonstrated in FIG. 9, the first step in the transaction flow FIG. 10 is the selection of an image from the memory of the device by the user using the human interface device 17, shown at step 10-1. Once the user selected an image from the memory of the device 6 the image would be retrieved from the storage of the device, demonstrated at 10-2.

Insofar as what is intended to be demonstrated by this particular flow chart is the combination of more than one external asset with an image captured and stored within the device 6, step 10-3 shows the stage in the flow where external assets could be retrieved from other storage locations, on a computer network or on the Internet, where the device 6 included a communications interface 17 by which external storage locations could be accessed. It may for example be the case that a mockup or a mash up was being made based on an image within the memory of the device 6 which was captured by the camera 7 along with one or more images to be accessed from the Internet. At this stage in the process, the image manipulation software could include the functionality to browse external storage locations using the communications interface 17 within the device 6 and to pull copies of those assets into the local memory of the unit 6 for use in such a final work. What is contemplated at this particular juncture in the workflow is that one or more external assets would be pulled in and incorporated into the edited image. The combination or editing of that image is demonstrated at step 10-4, with the saving of the finished image to memory at 10-5. Again that could either be the end of the manipulation transaction or the edited image could be moved on for display by the projector 8.

The present invention is not limited to a particular processor architecture, operating system, or computer programming language. Any limitations presented as a result of specific architectures, operating systems or computer programming languages are not intended as limitations of the present invention.

The previous description of the disclosed embodiments is provided to enable any person skilled in the art to make or use the present invention. Various modifications to those embodiments will be readily apparent to those skilled in the art, and the generic principles defined here in may be applied to other embodiments without departing from the spirit or scope of the invention as described. Thus, the present invention is not intended to be limited to only the exemplary embodiments shown herein, but is to be accorded the full scope consistent with the claims, wherein in reference to an element in the singular such as by use of the article "a" or "an" is not intended to mean "one and only one" unless specifically so stated, but rather "one or more." All structural and functional equivalence to the elements of the various embodiments described throughout the disclosures that are known or may later come to be known to those of ordinary skill in the art are intended to be encompassed by the elements of the claims. Moreover nothing disclosed herein is intended be dedicated to the public regardless of whether such disclosure is explicitly recited in the claims.

The invention claimed is:

1. A portable image storage device with integrated projector, said device comprising:
   a memory for the storage of data corresponding to a first digital image;
   an integrated projector for the external projection and display of the first digital image;
   a processor being configured to run an image display application for retrieval of the first digital image data stored in the memory and to display the first digital image via the integrated projector;
   a projector activator allowing a user to select the first digital image stored within the memory for display;
   a communication interface operative to allow the device to retrieve a second digital image from a storage location outside the device; and
   an image manipulation software component resident on the portable image storage device and useable by a user to conduct image manipulation of the first digital image stored in the memory while the first digital image is displayed by the integrated projector on an external projection surface and store the manipulated first digital image in the memory, to combine the first digital image and the second image into a single digital image while the first digital image and the second digital image are displayed by the integrated projector on the external projection surface, to display the single digital image by the integrated projector on the external projection surface and to store the signal digital image in the memory.

2. The device of claim 1 wherein the projector activator invokes the image display application in response to user selection of the first digital image for display.

3. The device of claim 1 wherein the image display application is incorporated within an operating system associated with the processor.

4. The device of claim 1 wherein the projector activator is a human interface device selected from the group including a button, a switch, a key, a dial, a touch pad, a touch screen, a key combination, and a software device.

5. The device of claim 1 further comprising a camera for capturing the image and storing image data corresponding to the first digital image to the memory.

6. The device of claim 5 further comprising mobile communications components.

7. The device of claim 6 wherein the device is a mobile phone.

8. The device of claim 5 wherein the camera is capable of capturing a still image.

9. The device of claim 5 wherein the camera is capable of capturing a video image.

10. The device of claim 1 wherein the image manipulation software component is incorporated within an operating system associated with the processor.

11. The device of claim 1 wherein the image manipulation software component is useable to adjust lighting of the first digital image, adjust coloring of the first digital image and crop the first digital image.

12. The device of claim 1 wherein the communication interface is one of: a wireless network interface; a wired network interface; and a port.

13. The device of claim 1 wherein the communication interface is a USB port.

14. The device of claim 1 further comprising browser software to navigate the Internet and access digital images over the Internet.

15. A method of displaying digital images using a portable image storage device with integrated projector, the portable image storage device including a memory for the storage of data corresponding to a first digital image, a processor being configured to run an image display application for the retrieval of the first digital image stored in the memory, an integrated projector for the external projection and display of the first digital image, and a projector activator allowing a user to select the first digital image stored within the memory for display, the method comprising:
   orienting the device such that there is a external projection surface in front of the integrated projector;
   detecting the selection of the first digital image from the memory for display via the projector activator;
   using the image display application, retrieving the data required for display of the first digital image from the memory, activating the projector and projecting the first digital image, resulting in the projection of the first digital image on the external projection surface;
   using an image manipulation software component resident in the image storage device to manipulate the first digital image while the first digital image is being displayed by the integrated projector on the external projection surface;
   using a communication interface of the device to obtain a second digital image from a storage location outside the device;

using the image manipulation software component to combine the first digital image and the second digital image into a single digital image while the first digital image and the second digital image are displayed by the integrated projector on the external projection surface;

displaying the single digital image by the integrated projector on the external projection surface; and saving the single digital image in the memory.

16. The method of claim 15 wherein the projector activator within the device is a human interface device selected from the group including a button, a switch, a key, a dial, a touch pad, a touch screen, a key combination, and a software device.

17. The method of claim 15 wherein the device further comprises a camera for capturing images and providing image data for said images to the processor for storage to the memory.

18. The method of claim 15 wherein the device is a mobile phone.

19. The method of claim 17 wherein the device is a mobile phone.

20. The method of claim 17 wherein the camera is capable of capturing still images.

21. The method of claim 17 wherein the camera is capable of capturing video images.

22. The method of claim 15 further comprising using the image manipulation software component to adjust lighting of the first digital image, adjust coloring of the first digital image and crop the first digital image.

23. The method of claim 15 wherein the communication interface is one of: a wireless network interface; a wired network interface; and a port.

24. The method of claim 23 further comprising using browser software resident on the device to navigate the Internet and access the second digital image over the Internet.

25. The method of claim 15 wherein the communication interface is a USB port.

* * * * *